(12) United States Patent
Houldsworth

(10) Patent No.: US 6,526,421 B1
(45) Date of Patent: Feb. 25, 2003

(54) METHOD OF SCHEDULING GARBAGE COLLECTION

(75) Inventor: Richard J. Houldsworth, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/537,822

(22) Filed: Mar. 29, 2000

(30) Foreign Application Priority Data

Mar. 31, 1999 (GB) .............................................. 9907280

(51) Int. Cl.[7] .............................................. G06F 17/30
(52) U.S. Cl. ........................................ 707/206; 707/101
(58) Field of Search .............................. 707/8, 103 R, 707/206, 101; 709/102, 314; 711/136, 153; 717/116, 149

(56) References Cited

U.S. PATENT DOCUMENTS 5,210,872 A * 5/1993 Ferguson et al. ............ 709/102
6,052,699 A * 4/2000 Huelsbergen et al. ....... 707/204

OTHER PUBLICATIONS

Jones et al., "Garbage Collection: Algorithms for Automatic Dynamic Memory Management", pp 1–18.
Paul R. Wilson, "Uniprocessor Garbage Collection Techniques", Proc. Of International Workshop on Memory Management, St. Malo, France, Sep. 1992.

* cited by examiner

Primary Examiner—Diane D. Mizrahi
Assistant Examiner—Apu M Mofiz
(74) Attorney, Agent, or Firm—Gregory L. Thorne

(57) ABSTRACT

A method of scheduling instructions to be executed concurrently by a processor, the processor being capable of executing a predetermined number of instructions concurrently. Instructions from a first process and a second process are interleaved according to a predetermined rule to give a third process. Instructions from the third process are then scheduled for execution at a first time point by the processor. Instructions of the first process generate data structures comprising data objects linked by identifying pointers in a memory heap. The second process comprises a garbage collection process for traversing the memory heap and reclaiming memory allocated to data structures unused by the first process.

11 Claims, 3 Drawing Sheets

METHOD OF SCHEDULING GARBAGE COLLECTION

BACKGROUND OF THE INVENTION

The present invention relates to a method and apparatus for scheduling garbage collection instructions for execution with instructions of other processes, and particularly to the scheduling of garbage collection instructions for processors having instruction level parallelism.

A current generation of computer processor architecture available provides the capability for instruction level parallelism, that is, the execution of multiple concurrent instructions in a single clock cycle. The instruction issue register for such a processor is typically divided into a number of slots. In a single clock cycle, the processor can process an instruction in each slot. Examples of processor architectures that provide such features are the Superscalar architecture and the Very Long Instruction Word (VLIW) architecture.

For a processor to be able to execute multiple concurrent instructions, each instruction and its effects must be independent of other instructions to be executed in the same clock cycle. For example, an instruction which doubled the value of a numerical variable could not be processed in the same clock cycle as an instruction which copied the value of the same variable to another variable. The requirement to determine which instructions are independent of each other, and could therefore be processed concurrently, has been solved in a number of different ways. In the Superscalar architecture, dedicated hardware has been implemented to determine independent instructions arriving at the instruction issue register. In the VLIW architecture, a program compiler has been implemented to generate very long instruction words consisting of a number of independent instructions concatenated together, a single VLIW being executed by the processor during each clock cycle.

Both approaches, however, suffer the same limitation. Very few programs that are run on VLIW, Superscalar or similar architecture processors have sufficient number of independent instructions to occupy all the slots of the processor all of the time. Generally, only multimedia applications, such as sound or image processing, where a large amount of processing is required to be performed on a large number of independent elements come close to occupying all the slots of the processor. Whilst the user of the computer having the processor would notice no adverse effects from unused slots of the processor, it is desirable that the most efficient use of the processor and its concurrent processing capabilities is made.

In Sun Microsystems' Java ® and some other languages and programming environments, such as Modula-3 and Cedar, a garbage collection process is run in parallel to a program process.

Garbage collection is the automated reclamation of system memory space after its last use by a programme. A number of examples of garbage collecting techniques are discussed in "Garbage Collection-Algorithms for Automatic Dynamic Memory Management" by R. Jones et al, pub. John Wiley & Sons 1996, ISBN 0-471-94148-4, at pages 1 to 18, and "Uniprocessor Garbage Collection Techniques" by P. R. Wilson, Proceedings of the 1992 International Workshop on Memory Management, St. Malo, France, September 1992. Whilst the storage requirements of many computer programs are simple and predictable, with memory allocation and recovery being handled by the programmer or a compiler, there is a trend toward functional languages having more complex patterns of execution such that the lifetimes of particular data structures can no longer be determined prior to run-time and hence automated reclamation of this storage, as the program runs, is essential.

A common feature of a number of garbage collection reclamation techniques, as described in the above-mentioned Wilson reference, is incrementally traversing the data structure formed by referencing pointers carried by separately stored data objects. The technique involves first marking all stored objects that are still reachable by other stored objects or from external locations by tracing a path or paths through the pointers linking data objects.

This may be followed by sweeping or compacting the memory—that is to say examining every object stored in the memory to determine the unmarked objects whose space may then be reclaimed.

Normally, the garbage collection and reclamation process runs on the computer in parallel to a program process, the garbage collector and reclamation process operating on the heap (memory area) occupied by data objects of the program process, so that garbage from the program process can be detected as soon as possible and the appropriate resources reclaimed.

In order to implement a garbage collection process in addition to a program process, each is normally executed as a separate thread operating on a shared heap. The execution of the processes in separate threads reduces the performance of both processes as they both must share the same processor resources. While one thread is being processed, the other may be suspended and vice-versa.

On the VLIW processor, each thread is likely to be compiled and executed separately with the processor resources being swapped alternately between the two threads.

SUMMARY OF THE INVENTION

According to the present invention, there is provided a method of scheduling instructions to be executed concurrently by a processor, the processor being capable of executing a predetermined number of instructions concurrently, the method comprising the steps of: interleaving instructions from a first process and a second process according to a predetermined rule to give a third process; and scheduling instructions from the third process for execution at a first time point by the processor, wherein instructions of the first process generate data structures comprising data objects linked by identifying pointers in a memory heap, and wherein the second process comprises a garbage collection process for traversing the memory heap and reclaiming memory allocated to data structures unused by the first process.

An advantage of the present invention is that unused concurrent execution resources of the processor are utilised for garbage collection without affecting the process being executed.

Preferably, the predetermined rule comprises scheduling instructions from the first process, determining whether there are less than the predetermined number of instructions scheduled for concurrent execution at the first time point, and if so, scheduling instructions from the second process for execution at the first time point.

By monitoring the processors capacity for further instructions, the garbage collection can be adaptively scheduled alongside a process without reducing the concurrent processing resources available to the process.

Alternatively, the predetermined rule may comprise the selection of alternate sets of instructions from the first and second processes. In another alternative, the predetermined rule may include the steps of determining the effect of scheduling instructions from the second process and, if detrimental, reducing the number of scheduled second process instructions.

Garbage collection instructions interleaved from the second process may take much more time to process than instructions from the first process. By selecting alternate sets or monitoring the effect of instructions from the second process, delaying effects of garbage collection instructions can be reduced accordingly.

According to the present invention, there is provided a data processing apparatus comprising a processor being capable of executing a predetermined number of instructions concurrently coupled with a random access memory containing a data structure comprising data objects linked by identifying pointers, the apparatus being configured to provide the following for operating on the stored plurality of data objects:

first means for interleaving instructions from a first process and a second process according to a predetermined rule to give a third process; and second means for scheduling instructions from the third process for execution at a first time point by the processor, wherein instructions of the first process generate the data structures in a memory heap, and wherein the second process comprises a garbage collection process for traversing the memory heap and reclaiming memory allocated to data structures unused by the first process.

The first and second means may comprise a program interpreter for executing instructions on the processor. The first and second means may comprise a program compiler for executing instructions on the processor. Alternatively, the first and second means comprise an instruction processing means for assembling and passing instructions to be executed concurrently to the processor.

BRIEF DESCRIPTION OF THE DRAWINGS

The invention will now be described by way of example only, with reference to the accompanying drawings, in which.

DETAILED DESCRIPTION OF THE PREFERRED EMBODIMENTS

Figure 1:
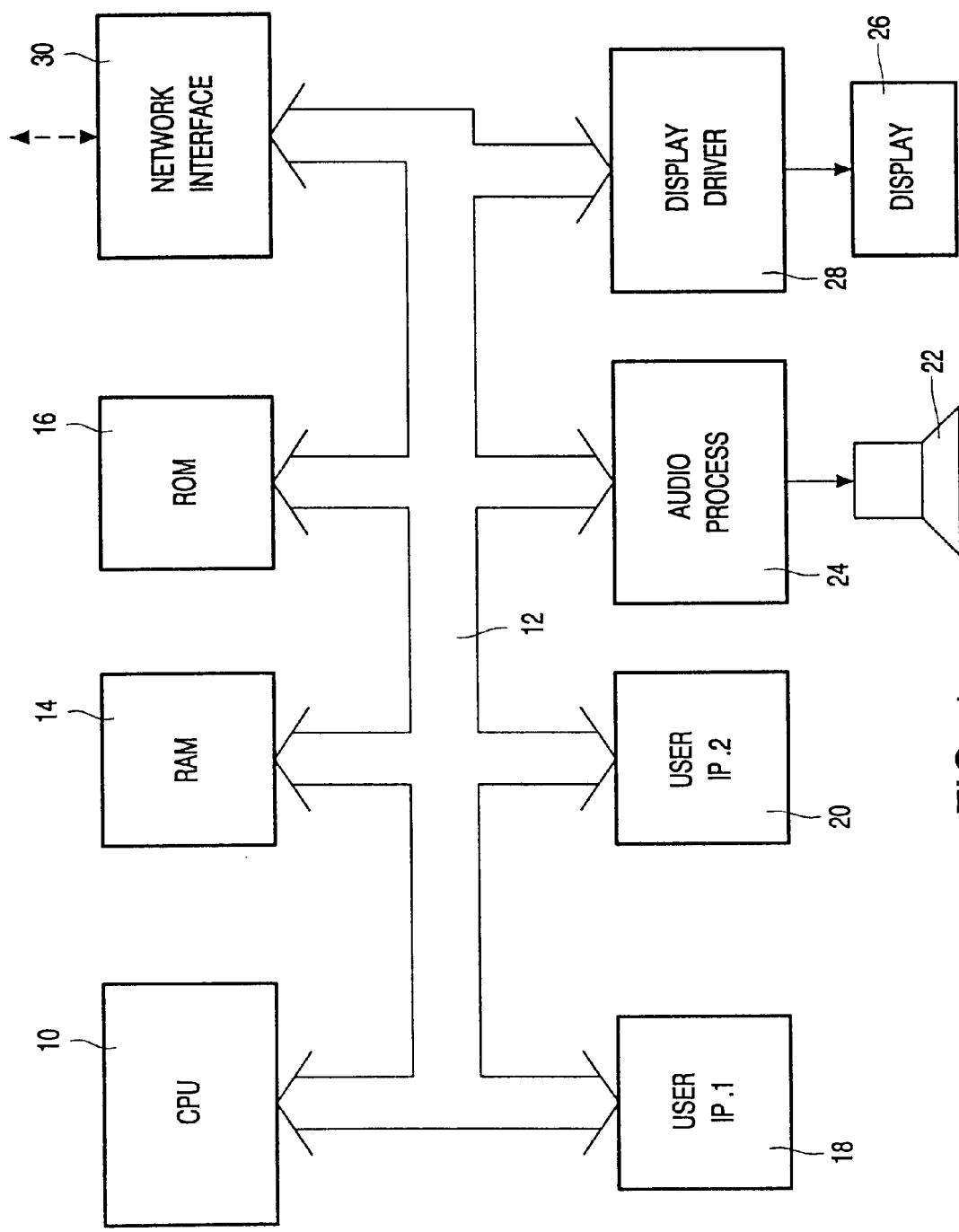
FIG. 1 is a block diagram of a data processing system suitable to embody the present invention.

FIG. 1 represents a data processing system, such as a personal computer, which acts as host for a number of software utilities which may, for example, configure the system as a browser for data defining a virtual environment. The system comprises a central processing unit (CPU) 10 having a VLIW processor coupled via an address and data bus 12 to random-access (RAM) and read-only (ROM) memories 14, 16. These memories may be comprised of one or several integrated circuit devices and may be augmented by a system hard-disk as well as means to read from additional (removable) memory devices, such as a CD-ROM. The present invention is particularly embodied in efficient scheduling of memory management operations for a working area of the RAM 14 under control of the CPU 10. Also coupled to the CPU 10 via bus 12 are first and second user input devices 18, 20 which may suitably comprise a keyboard and a cursor control and selection device such as a mouse or trackball. Audio output from the system is via one or more speakers 22 driven by an audio processing stage 24. Video output from the system is presented on display screen 26 driven by display driver stage 28 under control of the CPU 10. A further source of data for the system is via online link to remote sites, for example via the Internet, to which end the system is provided with a network interface 30 coupled to the bus 12.

Figure 2:
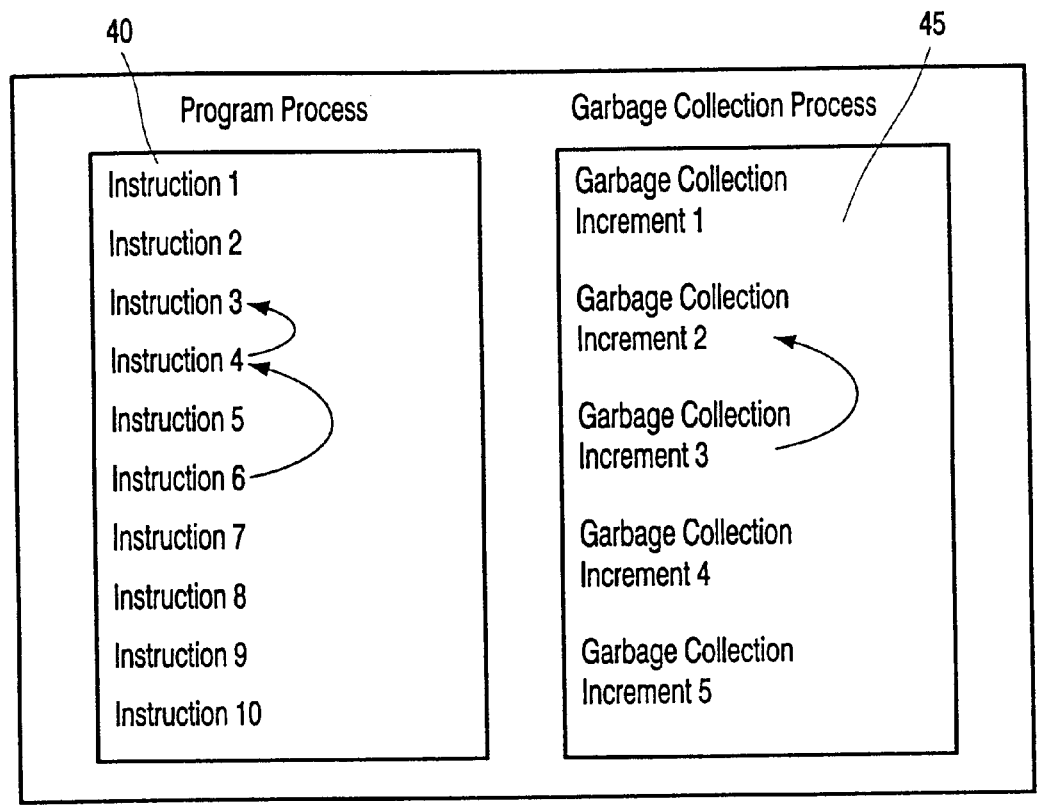
FIG. 2 is a queue of instructions issued by a program process and a garbage collection process for execution.

FIG. 2 represents a queue of instructions issued by a program process thread 40 and a garbage collection process thread 45. The two threads are swapped in and out of the processor during their execution such that a number of instructions from each are executed for one thread before the processor turns its attention to another thread. Those instructions which are dependent on the prior execution of others are shown by an arrow linking the instruction to that which it is dependent upon.

Figure 3:
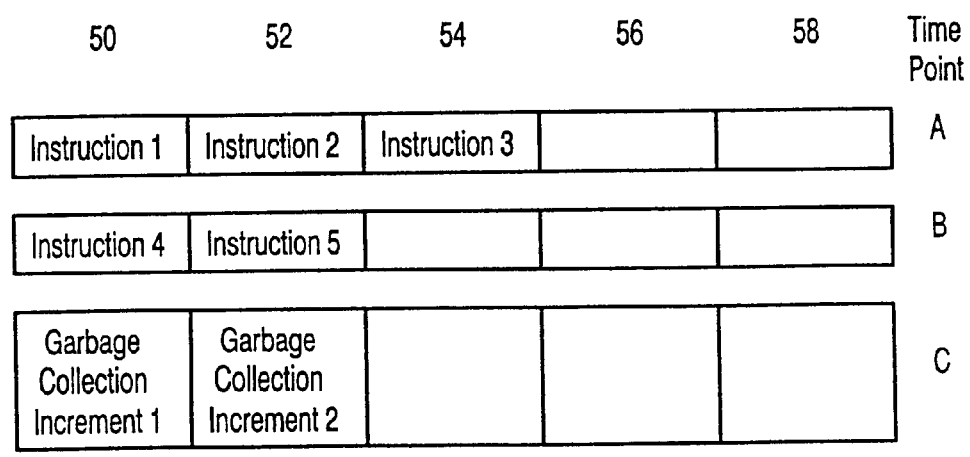
FIG. 3 represents a VLIW processor with instruction slots processing the queue of FIG. 2.

FIG. 3 represents a VLIW processor having 5 instruction slots 50–58 and which operates to execute instructions from two processes (a program process and a garbage collection process) in conventional manner. The state of the instruction slots is shown at consecutive clock cycles (time points) A, B and C, during which the instructions of FIG. 2 are executed.

At A, the program process thread is currently being executed by the processor. Instructions 1, 2 and 3 are entered in slots 50, 52 and 54 respectively and therefore scheduled for concurrent execution. However, Instruction 4 cannot be executed until after the execution of Instruction 3 and therefore prevents further instructions being executed during clock cycle A.

At B, instructions 4 and 5 are entered into slots 50 and 52 respectively. Instruction 6 cannot be executed as it is dependent on instruction 4 being executed.

At C, the program process thread is suspended and the garbage collection process thread resumes. Garbage collection increments 1 and 2 are entered in slots 50 and 52 respectively, garbage collection increment 3 being dependent on the execution of increment 2. A garbage collection increment may comprise a single instruction or a number of instructions which must be executed consecutively in the same clock cycle. However, in this description it is assumed that each increment comprises a single instruction.

Figure 4:
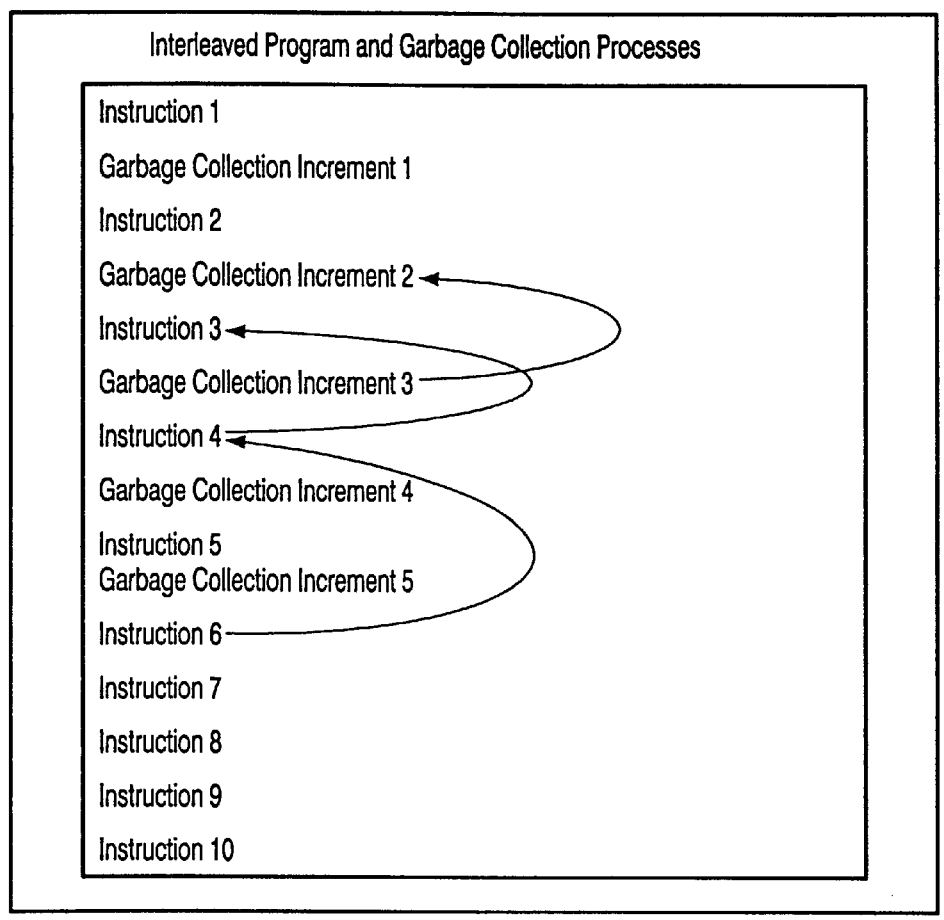
FIG. 4 is the queue of instructions of FIG. 2 scheduled for execution according to the method of the present invention.

FIG. 4 represents the queue of instruction of FIG. 2 which have been scheduled according to the method of the present invention.

In order to implement a garbage collection process that uses spare processor resources unused by the program process thread, the program process loop has been combined with the garbage collection process loop to give a single process loop where garbage collection increments are interleaved between program instructions;

Repeat
    Execute next program process instruction
    Perform increment of garbage collection
Until program process ends As the garbage collection increments are independent of the program instructions, their instructions parasitically occupy the resources that are unused by the program thread.

The queue of instructions of FIG. 4 is then processed to determine independent instructions which can be executed concurrently.

Figure 5:
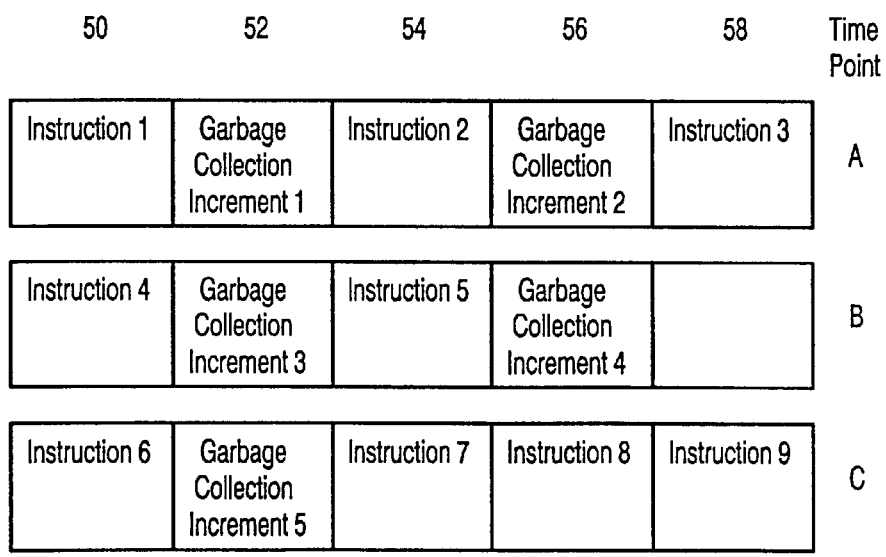
FIG. 5 represents the VLIW processor of FIG. 3 executing the instructions of FIG. 4.

FIG. 5 represents the VLIW processor of FIG. 3 with instruction slots 50–58. The state of the instruction slots is shown at consecutive clock cycles (time points) A, B and C, during which the instructions of FIG. 4 are executed.

At A, instruction 1, garbage collection (GC) increment 1, instruction 2, GC increment 2 and instruction 3 are entered into slots 50–58 respectively. Once all the slots are filled, the instructions and increments are concurrently executed.

At B, instruction 4, GC increment 3, instruction 5 and GC increment 4 are entered into slots 50–56 respectively. Instruction 6 cannot be executed concurrently with instruction 4 and therefore prevents slot 58 from being used.

At C, instruction 6, GC increment 5 and instructions 7 to 9 are entered in slots 50–58 and executed concurrently.

It will be appreciated that no drop in the performance of the processor occurs as a result of the interleaving of instructions from the program and garbage collection threads. Indeed, in the above illustrated case, by scheduling the instructions according to the method of the present invention many more instructions were executed in the example of FIG. 5 than in the example of FIG. 3.

Garbage collection algorithms, by the nature of the work they have to do, require a great deal of a processor's resources. In normal multithreaded environments, each GC increment can require much more time and processor resources to be executed. In order to interleave GC increments with program instructions, it is necessary to decompose the garbage collection algorithm into sufficiently small increments of work that the workload per increment would not dominate the processing time of the combined set of instructions and increments. An example of a standard mark-sweep garbage collection algorithm and the increments it can be decomposed into is shown in the table below. A handle table is maintained containing references to all objects in the heap in order to avoid having to scan empty memory areas during the sweep;

| Increment Type | Description |
|---|---|
| 1 | Initialisation - Preparation of state for cycle (1 increment) |
| 2 | Root Marking - Placing references to root objects onto mark list. (n increments, where n = number of root objects) |
| 3 | Marking - Removal of references from mark list, marking referenced objects and placing referenced descendant objects onto mark list (d increments, where d = number of data objects in heap) |
| 4 | Sweep - Sweep of handle table for unmarked objects. (h increments, where h = size of the handle table) |
| 5 | Reclamation - Reclaiming memory allocated to unmarked objects. (r increments, where r = number of unmarked objects) |

Each increment performs an operation on one object as an atomic action. Due to the type of operations, increments should not be decomposed further as each operation on an object should be completed in a single clock cycle to avoid possible conflict from other instructions or operations on the object. Obviously the size of the object determines the duration of each garbage collection increment. Therefore large objects may create pauses in the program's execution. Further decomposition of GC increments, whilst possible, results in the loss of atomicity of operations on objects with the associated complexity and disadvantages highlighted above.

In a preferred embodiment of the present invention, the program process instruction loop is unrolled so that a number of program process instructions are executed in each repetition of the loop prior to interleaving of GC increments;

Repeat
    Execute next program process instruction
    Execute next program process instruction
    Execute next program process instruction
    Execute next program process instruction
    Perform increment of garbage collection
Until process ends By unrolling the program process instruction loop, the effects of pauses caused by large objects during the GC increments on the program execution is minimised.

As the number and type of increments to he executed required during garbage collection depends on the number of objects in the heap and the number of those which are garbage, the instruction to perform an increment cannot be any more specific (ie. increment type 1–5 as previously described) until run-time. Whilst this would not affect interpreted code, where the appropriate type (1–5) of GC increments could be interleaved where appropriate as the interpreter executes the process, direct GC function calls or inlined code cannot be used in compiled code. Therefore, for compiled code such as just-in-time compiled code it is necessary to place the address of the code for tie next GC increment in a variable or register and interleave indirect calls to the variable or register in the compiled code.

In a preferred embodiment, the number of instruction issue slots that are not occupied per clock cycle due to instruction dependencies in a program process is monitored so that the free slots can be filled with garbage collection increments.

In a further preferred embodiment of the present invention, the interleaving of the GC increments in between the program instructions is performed adaptively so as to maximise the usage of processor resources whilst minimising delays associated with the GC increments. In order to maximise the usage of processor resources, it is preferable for the interpreter, compiler or instruction scheduling hardware to monitor the program instructions and their dependencies so that GC increments can be placed in spare processor instruction slots. At the same time it might be possible to gauge the duration of the GC increment to be interleaved to determine whether the interleaving would adversely affect the performance of the program instructions.

Many VLIW processors permit the use of guards or predicates to control whether an instruction is executed. In practice, if a register value associated with the instruction meets a condition defined by the predicate or guard, the instruction is scheduled for execution. Using this facility, the scheduling system can be adapted to dynamically adjust the number of garbage collection increments scheduled by adjusting the predicate conditions for garbage collection increment scheduling as the resources available from the processor varies. Predicates can also be used to indicate state, therefore if certain types of instruction or increment should not be scheduled in the same clock cycle as another type of instruction or increment, such as dependent instructions, functional unit requirements or garbage collection operations which should be operated serially (sweep should follow mark etc), such instruction or increment types could be guarded by predicates. In this manner, a mark sweep garbage collector would have sweep increments disabled whilst mark increments are active and vice versa.

The above description has been written under the assumption that the scheduling of instructions is halted on reaching an instruction which is scheduled to be executed during the same clock cycle. However, a dependent instruction does not necessarily block all further instructions and the scheduling system could therefore be configured to find further non-dependent instructions to be executed that clock cycle. Furthermore, in addition to inter-instruction dependencies, an instruction using a functional unit of the processor (eg. floating point functional unit) may block other instructions from using the functional unit that clock cycle.

Although defined principally in terms of a software implementation, the skilled reader will be well aware that the above-described functional features could equally well be implemented in hardware, or in a combination of software and hardware.

From reading the present disclosure, other modifications will be apparent to persons skilled in the art. Such modifications may involve other features which are already known in the design, manufacture and use of data processing and storage apparatus and devices and component parts thereof and which may be used instead of or in addition to features already described herein.

What is claimed is:

1. A method of scheduling instructions to be executed concurrently by a processor, the processor being capable of executing a predetermined number of instructions concurrently, the method comprising the steps of:

interleaving instructions from a first process and a second process according to a predetermined rule to give a third process; and scheduling a plurality of instructions from the third process for concurrent execution at a first time point by the processor, the plurality of instructions being configured to allow instructions from the first process and the second process to be concurrently executed, wherein instructions of the first process generate data structures comprising data objects linked by identifying pointers in a memory heap, and wherein the second process comprises a garbage collection process for traversing the memory heap and reclaiming memory allocated to data structures unused by the first process.

2. A method as claimed in claim 1 wherein predetermined rule comprises scheduling instructions from the first process, determining whether there are less than the predetermined number of instructions scheduled for concurrent execution at the first time point, and if so, scheduling instructions from the second process for execution at the first time point.

3. A method as claimed in claim 1, wherein the predetermined rule comprises the selection of alternate sets of instructions from the first and second processes.

4. A method as claimed in claim 1, wherein the predetermined rule includes the steps of determining the effect of scheduling instructions from the second process and, if detrimental, reducing the number of scheduled second process instructions.

5. A program storage device readable by a machine and encoding one or more programs of instructions for executing the method steps of claim 1.

6. A data processing apparatus comprising a processor being capable of executing a predetermined number of instructions concurrently coupled with a random access memory containing a data structure comprising data objects linked by identifying pointers, the apparatus being configured to provide the following for operating on the stored plurality of data objects:

first means for interleaving instructions from a first process and a second process according to a predetermined rule to give a third process; and second means for scheduling a plurality of instructions from the third process for concurrent execution at a first time point by the processor, the plurality of instructions being configured to allow instructions from the first process and the second process to be concurrently executed, wherein instructions of the first process generate the data structures in a memory heap, and wherein the second process comprises a garbage collection process for traversing the memory heap and reclaiming memory allocated to data structures unused by the first process.

7. A data processing apparatus as claimed in claim 6, wherein the first and second means comprise a program interpreter for executing instructions on the processor.

8. A data processing apparatus as claimed in claim 6, wherein the first and second means comprise a program compiler for executing instructions on the processor.

9. A data processing apparatus as claimed in claim 6, wherein the first and second means comprise an instruction processing means for assembling and passing instructions to be executed concurrently to the processor.

10. A method of scheduling execution of instructions from a plurality of processes on a processor that is capable of executing a multiple-instruction command, comprising:

interleaving instructions of the plurality of processes to form an interleaved sequence of instructions, allocating a first instruction of the interleaved sequence of instructions to a first instruction-slot of the multiple-instruction command, and for each subsequent instruction of the interleaved sequence of instructions:

if a subsequent instruction-slot of the multiple-instruction command is available and the subsequent instruction is independent of execution of a prior instruction contained in the multiple-instruction command:

allocating the subsequent instruction to the subsequent instruction-slot in the multiple-instruction command;

otherwise:

schedule the multiple-instruction command for execution by the processor.

11. The method of claim 10, wherein the plurality of processes include:

one or more processes that are allocated memory in a memory heap, and a reclamation process that deallocates memory in the memory heap.

* * * * *